Oct. 12, 1971  B. FUTTERER  3,611,572
PERFORATED CUTTING FOIL OR PLATE FOR SHAVERS
AND METHOD FOR MAKING
Filed Sept. 16, 1968

United States Patent Office 3,611,572
Patented Oct. 12, 1971

3,611,572
PERFORATED CUTTING FOIL OR PLATE FOR SHAVERS AND METHOD FOR MAKING
Bodo Futterer, Schonbuhlring, Switzerland, assignor to The Gillette Company, Boston, Mass.
Filed Sept. 16, 1968, Ser. No. 760,011
Claims priority, application Switzerland, Sept. 15, 1967, 13,053/67
Int. Cl. B26b 19/04
U.S. Cl. 30—346.51    2 Claims

ABSTRACT OF THE DISCLOSURE

A cutting foil for dry shavers in which a bearing metal is provided on the underside thereof to minimize wear and friction between the foil and a cutter blade, and the method of making such a foil.

BACKGROUND AND OBJECTS

The present invention concerns a perforated cutting foil or plate for shavers, more particularly for dry shavers having elevated perforation edges, and a method of producing the foil.

Electric shavers generally consist of a fixed cutting plate or cutting foil and a rotating or reciprocating movable cutter head, cutter or cutter foil. These parts are made as hard and smooth as possible to minimize wear and tear and to obtain a long life of the cutting edges.

It has been found, however, that after a short operating time, adhesive forces arise between the cutting elements in contact with one another, especially when the film of grease between the cutting elements has been destroyed by external influences, e.g. skin perspiration. As a result the cutting elements slidingly engaging with one another develop considerable heat owing to the increased friction, the cutting speed is reduced and the output requirement increases and wear and tear increases. Also the cutting action of the shaver also deteriorates as a consequence.

The object of the invention is to provide a perforated cutting foil for shavers which even over long operating periods operates with a low, unvariable friction and which is usable more particularly for dry shavers.

SUMMARY OF THE INVENTION

In accordance with the invention the problem is solved by the fact that the underside of the cutting foil which is in contact with a cutter is provided with a coat of a bearing metal which, in the region of the perforation edges, is flush with the plane of the perforation edge elevations. As a result the moving cutter engages particles of the bearing metal spread over the surface of the perforation edge elevations in contact with the cutter. This surface is thereby coated with a thin layer of the bearing metal, thereby stabilizing the frictional properties of the surface.

Preferably tin is used as the bearing metal.

In addition, the surface of the cutter foil may be provided with a hard layer forming the cutting edge. This minimizes the premature wearing of the cutting edges.

The method of producing perforated cutting foils in accordance with the invention is carried out in such a manner that a metal base plate at the perforation regions is covered with an insulating material in order here to prevent the galvanoplastic deposit of metal, whilst the part of the metal base plate remaining free from the insulating material on which the deposit is to be effected, is provided galvanoplastically with a metal coat, the thickness of which is such that the insulating material regions are framed at the edges whereupon the metal coat is passivated, and that a coat of a bearing metal is applied galvanoplastically on the passivated metal coating and subsequently a layer of a solid metal forming the supporting layer of the cutting foil is deposited on the unpassivated surface of the bearing metal.

In accordance with a further development, a still harder metal can be galvanoplastically applied to the surface of the metal carrying the layer to obtain cutting edges having a longer life.

BRIEF DESCRIPTION OF THE DRAWINGS

The invention will be described further, below by way of example, with reference to the accompanying drawings in which.

DETAILED DESCRIPTION OF THE INVENTION

Figure 1:
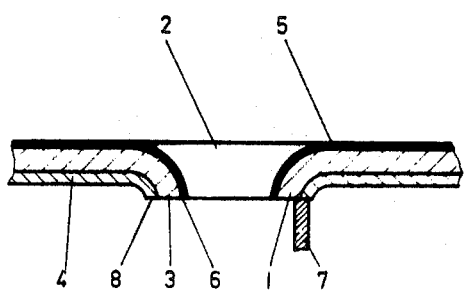
FIG. 1 is a sectional view of a part of a perforated cutting foil in the region of a perforation.

A preferred cutting foil for dry shavers is shown in FIG. 1 in which the cutting foil consists of a carrier layer 1 of, for example, nickel which, in the region of the perforations 2 has an elevated edge 3, the surface of which extends parallel to the plane of the cutting foil. On the underside of the supporting layer 1, a layer of tin 4 is applied which is also elevated in the region of the perforations and which is flush with the plane of the surface 3. The cutting foil, moreover, has on the surface a layer 5 made of a hard metal which also terminates in the plane of the surface 3 and forms the cutting edge 6. All three layers 1, 4 and 5 in the elevated region of a perforation 2 end of the same level. A cutter 7 is shown which with its cutting edge is supported against the elevated region of the perforation edges.

During its stroke, the cutter 7 moves over the perforation edge surface 8 of the tin layer and forcibly engages tiny tin particles and distributes these over the adjacent perforation edge of the supporting layer 1 and the hard layer 5. This action stabilizes the frictional properties of this surface so that the cutting properties of such a cutting foil are also improved.

Figure 2:
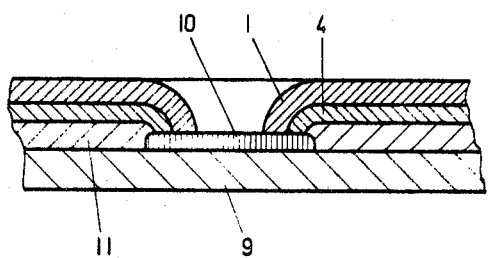
FIG. 2 shows a region corresponding to FIG. 1 of a cutting foil on the matrix used for producing it.

A perforated cutting foil is shown in FIG. 2 consisting of the supporting layer 1 and the bearing metal layer 4 on the matrix used for producing it. The matrix includes a metal base plate 9 on which, at the points where the foil is to be perforated, islands 10 of insulating material are provided. An intermediate metal layer 11 is so applied to the metal base plate as to encircle the edges of the islands 10 of insulating material. After the surface of the intermediate metal layer 11 has been passivated, the bearing metal layer 4, such as a layer of tin, is galvanoplastically deposited on the intermediate metal layer 11. After this a further metal layer, for example of nickel, is galvanoplastically desposited on the unpassivated surface of the bearing metal layer 4. Since the surface of intermediate layer 11 is passivated, the cutting foil, made of bearing metal layer 4 and the supporting layer 1, is readily removed from the matrix. The matrix may then be used to produce further cutting foils.

The perforated cutting foil in accordance with the invention may also be made in an alternative manner, such that a bearing metal layer is applied by evaporation to the underside of the supporting layer 1.

Other known methods are also suitable for application of the bearing metal layer.

I claim:

1. A method of producing perforated cutting foils in which a layer of bearing metal is provided on the underside of the foil in contact with a cutting blade and which is flush with the perforation edge elevations in which a metal base plate is coated at the perforated edges with an insulating material, in order there to prevent a galvanoplastic deposit of metal, whilst a portion remaining free of insulating material of the metal base plate on which the deposit is to occur, is provided galvanoplastically with a metal coating, the thickness of which is such that the insulating material regions are encircled at their edges, whereupon the metal coating is passivated, characterized by the feature that a layer of a bearing metal is galvanoplastically applied on the passivated metal coating and subsequently a solid metal forming the supporting layer of the cutting foil is deposited on the surface of the bearing metal.

2. A method as claimed in claim 1, in which a still harder metal is galvanoplastically applied on the surface of the metal forming the supporting layer.

References Cited
UNITED STATES PATENTS 3,064,349   11/1962   Futterer _____ 30—43

OTHELL M. SIMPSON, Primary Examiner

UNITED STATES PATENT OFFICE
CERTIFICATE OF CORRECTION

Patent No. 3,611,572            Dated October 12, 1971

Inventor(s) Bodo FUTTERER

It is certified that error appears in the above-identified patent and that said Letters Patent are hereby corrected as shown below:

Delete Claims 1 and 2 as printed and insert therefor the following Claims 1 and 2:

--1. A perforated cutting foil for dry shavers comprising:
    a) a carrier layer having elevated planar perforation edges cooperating with a cutting blade,
    b) the undersurface of said carrier layer having a layer of tin bearing metal,
    c) said layer of bearing metal having edge surfaces flush with said planar edges. --

--2. A cutting foil as claimed in Claim 1, in which the surface of the cutting foil is provided with a hard layer forming the cutting edge. --

In the heading, Column 1, line 4, delete "Schonbuhlring" and insert in its place --Luzern--.

Signed and sealed this 2nd day of May 1972.

(SEAL)
Attest:

EDWARD M. FLETCHER, JR.
Attesting Officer

ROBERT GOTTSCHALK
Commissioner of Patents